United States Patent [19]

Jurmain et al.

[11] Patent Number: 5,443,388
[45] Date of Patent: Aug. 22, 1995

[54] INFANT SIMULATION SYSTEM FOR PREGNANCY DETERRENCE AND CHILD CARE TRAINING

[76] Inventors: Richard N. Jurmain; Mary M. Jurmain, both of 10321 Muchacha Way, San Diego, Calif. 92124

[21] Appl. No.: 283,547

[22] Filed: Aug. 1, 1994

[51] Int. Cl.6 .............................................. A63H 3/28
[52] U.S. Cl. .................................. 434/238; 446/297; 446/301; 446/302; 446/303
[58] Field of Search .............................. 446/297–303; 434/238, 266

[56] References Cited

U.S. PATENT DOCUMENTS

| | | | |
|---|---|---|---|
| 4,231,184 | 11/1980 | Corris et al. | 446/301 X |
| 4,249,338 | 2/1981 | Wexler | 446/297 X |
| 4,451,911 | 5/1984 | Klose et al. | 446/303 |
| 4,696,653 | 9/1987 | McKeefery | 446/175 |
| 4,717,363 | 1/1988 | Refabert | 434/266 X |
| 4,840,602 | 6/1989 | Rose | 446/297 X |
| 5,011,449 | 4/1991 | Handy et al. | 446/297 |
| 5,083,965 | 1/1992 | Mayem | 446/302 X |
| 5,092,811 | 3/1992 | Bergenguer | 446/301 |
| 5,281,180 | 1/1994 | Lam et al. | 446/302 X |
| 5,314,336 | 5/1994 | Diamond et al. | 446/297 X |

Primary Examiner—Richard J. Apley
Assistant Examiner—Glenn E. Richman
Attorney, Agent, or Firm—John R. Duncan; Frank D. Gilliam

[57] ABSTRACT

An infant care simulation system for use in teaching individuals the realities, responsibilities and constraints inherent in caring for young babies. The system also demonstrates the special problems of drug-dependent babies. Basically the system includes a doll having the shape and weight of a young baby and accessories of the sort used with such a baby. The doll and accessories are assigned to an individual for an extended period such as several days. A sound system and electronic circuitry are included within the doll to generate sounds simulating a baby crying at selected intervals for selected time periods. A spring loaded key or other manual switch is provided so that the individual can turn off the crying sound by holding the key in an off position. Preferably the key is secured to the assigned individual in a way preventing it being given to another person. Indicators showing rough handling, improper positioning of the doll, periods before a response is made to a crying signal, etc. are provided. Mechanisms demonstrating the characteristics of a drug-dependent baby are included. The overall system also includes accessories, such as car seats, strollers and diaper bags that are to be taken everywhere with the doll.

23 Claims, 2 Drawing Sheets

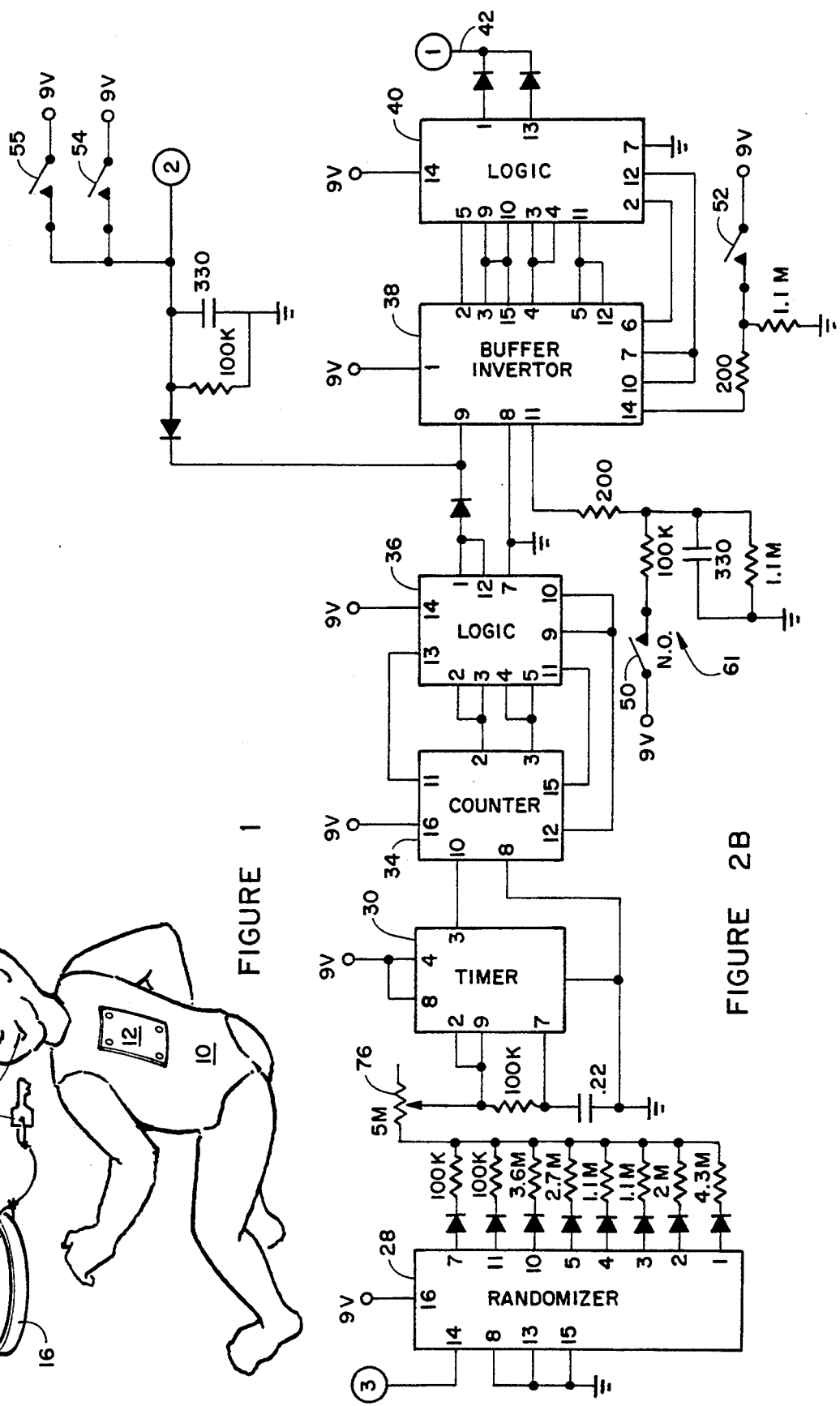

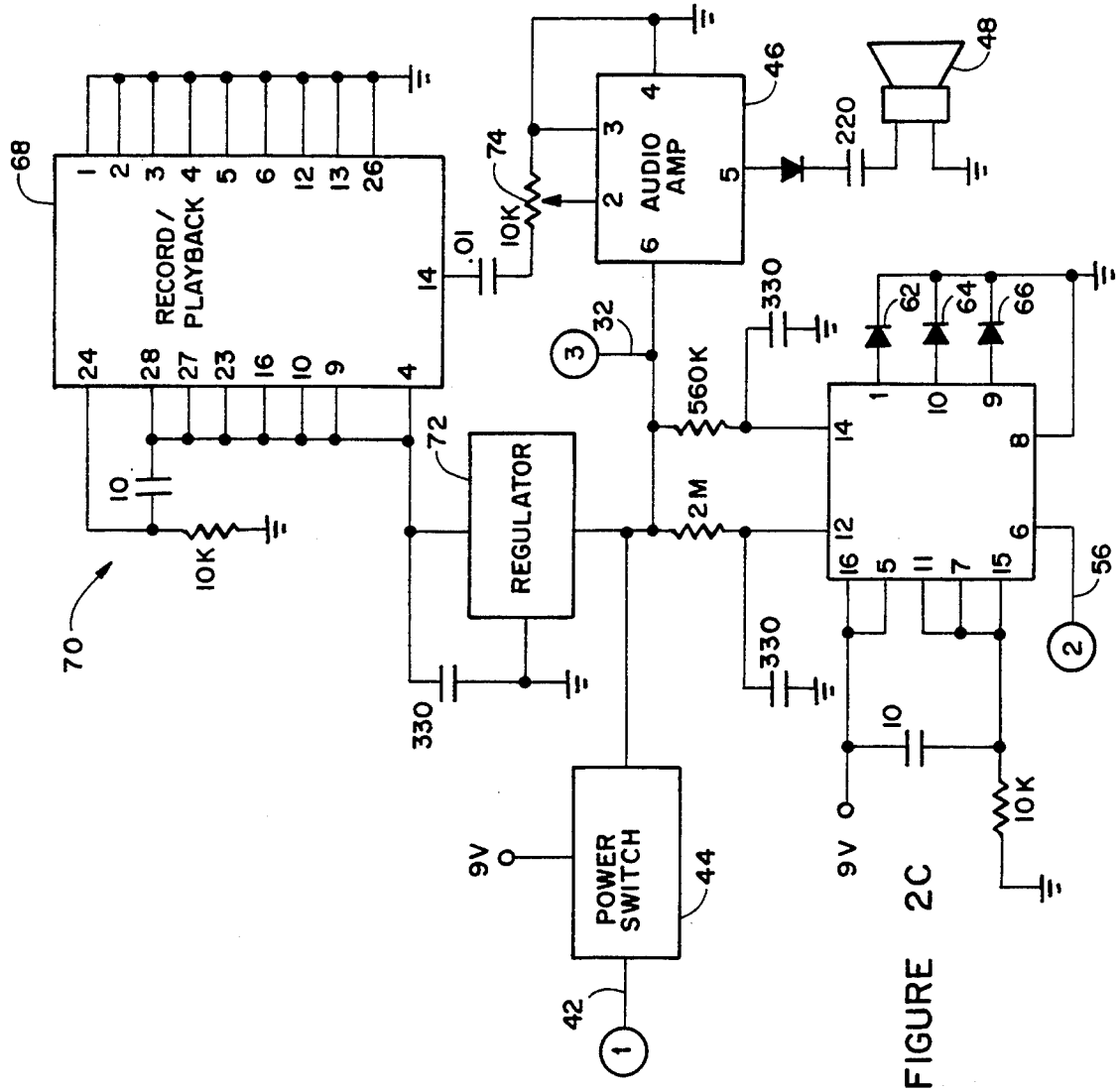

INFANT SIMULATION SYSTEM FOR PREGNANCY DETERRENCE AND CHILD CARE TRAINING

BACKGROUND OF THE INVENTION

This invention relates in general to devices and methods for teaching early parenthood responsibilities and, in particular, to an infant simulator system useful in programs for teaching teen age persons the realities and rigors of early parenthood.

Teen age pregnancy and single parent infant rearing are increasing problems. Teen age parents surveyed give such reasons for becoming pregnant as "babies are so cute", "I wanted attention", "I needed someone to love and love me back". Romantic feelings toward having a baby of one's own almost never include an understanding of the burdens of caring for a baby, the loss of sleep, loss of freedom, etc. Attempts in school parenting and life experience classes are rarely successful in convincing students that baby care is a full time, very restricting, occupation.

Some schools have attempted to demonstrate the care needs of a baby by having students carry a sack of flour, an egg or a plant wherever they go. While somewhat restrictive and requiring some care, these programs are less than successful. In particular, they do not demonstrate the continuous, unpredictable demands, the isolation from peers and the sleep interruptions that necessarily result from caring for a baby.

Dolls that can be "fed" from a bottle, then "wet" so as to require that a diaper be changed, such as described by Kelley in U.S. Pat. No. 5,094,644, and Burks in U.S. Pat. No. 4,115,948 have been available in a variety of degrees of complexity. These dolls are not useful in teaching baby care problems, since the feeding and wetting cycle is under control of the user, who can feed and change the doll at convenient times and does not learn that required feeding and changing of very young babies generally occurs at inconvenient times and places.

Dolls that can making crying sounds are known, such as that described by wexler in U.S. Pat. No. 4,249,338. This doll includes a manual switch to start the crying sound, then the user attempts to determine which of several actions, such as feeding, diaper changing, back patting will operate a random switch to turn off the crying sound. However, this doll, while interesting as a plaything, does not simulate an actual baby since crying only begins when the switch is actuated and not on a day and night random schedule as with an actual baby.

Other dolls having manually actuated crying, talking or wetting actions are described by Lyons et al. in U.S. Pat. No. 4,160,338 and Berman et al. in U.S. Pat. No. 4,516,950.

These prior dolls do not truly simulate the needs of an actual baby which can occur at random intervals at any time of day or night and require care for more than a few minutes at a time, such as feeding over 20-30 minutes at a time. Further, these prior dolls do not require gentle handling of the dolls and do not indicate if rough handling has occurred.

In order to more accurately simulate actual baby care, a number of accessories and a variety of equipment, such as diaper bags, car seats, strollers, etc. should be included. The prior art does not suggest such a complete simulation and training system.

Furthermore, the prior programs do not expose the participants to the special needs of drug dependent babies (so-called "crack babies") and fetal alcohol syndrome babies which are becoming an increasing problem. These babies have smaller than normal sizes and weights and different behavior patterns, including trembling bodies, a high-pitched tremulous cry and slow response to care. Exposure to such babies may help convince pregnant young women to avoid drugs and alcohol.

Thus there is a continuing need for improved training systems for simulating early parenthood, including realistic dolls and related equipment for teaching teenagers, both boys and girls, of the problems inherent in early, single-parent, parenthood which would aid in deterring early pregnancies. Such a system would cause unwed teenagers to carefully think it over before becoming pregnant.

SUMMARY OF THE INVENTION

The above-noted problems, and others, are overcome in accordance with this invention by an infant care simulation system which basically comprises dolls having the approximate size and weight of a young baby, e.g. an up to 3 months old baby, typically a normal baby weighing 7-8 lbs or a premature or drug dependent baby weighing 4-5 lbs. Electronic circuitry is contained within the doll for generating sounds simulating a baby crying on a selected but somewhat random schedule and for causing the sounds to continue for a selected but somewhat random length of time. Typically a teacher or other person supervising the training will set the crying schedule to simulate a sick or well baby's usual crying schedule. A quieting device, such as a spring-loaded push button, plug or key is provided to simulate "feeding" or "comforting" the baby. Continuous actuation during the crying period, e.g., holding a button down, holding a spring-loaded key in the turned position, is required to quiet the crying sound.

In order to prevent the assigned individual from having someone else care for the doll, it is preferred that a key be used, attached to a bracelet of the type used in hospitals, which must be cut for removal. For maximum simulation, the key could have the appearance of a baby bottle nipple or miniature baby bottle and could be inserted into the doll's mouth.

In addition, it is preferred that a means be provided to indicate or record the time between the beginning of a crying simulation period and the initiation of care, i.e., pressing the button or insertion and turning of the key. This measures the responsiveness of the assigned individual to the baby's needs so that the person supervising the training can review the care given. Conventional elapsed time clock equipment could be used, or one or more lights, such as light emitting diodes (LED) which are turned on in series after selected continuous crying periods.

An individual is assigned the doll for a selected period, e.g., 2-4 days. The person will take the doll and certain accessories wherever he or she goes and will keep the doll near his or her bed at night. Preferably, where a key is used, the key is secured to a bracelet around the assigned individual's wrist which can only be removed by destroying the bracelet, so that the assigned individual cannot have someone else operate the key. Thus, the crying sound may begin at any time, at night, in a classroom, at the mall, etc. The individual will have to stop other activities (and wake up, if at night) and attend to the doll for the crying period of time. This, plus a requirement that a stroller, car seat, diaper bag, etc. be taken along with the doll wherever the individual goes will show the individual at least some of the responsibility and inconvenience of caring for an actual baby. This should cause the person to think over the responsibilities and serious impact on their lifestyle inherent in having a baby.

For maximum simulation of reality, the doll should be kept in a "sleeping" position, on its side or stomach between "feeding" episodes and should be held on its back during feeding. A sensor and recording means can be included to record times when the doll is not in these preferred positions. The sensor may also initiate crying when the baby is not in a preferred position.

Teaching gentle handling of babies is also very important. Often young parents inadvertently injure babies through rough treatment. An inertial switch means is preferably included, connected to the recorder, to record instances of rough handling and to initiate crying, which can be stopped by "comforting" the baby using a key or switch, as with feeding. Typically, a weighted, spring loaded, normally open switch can be used which will momentarily close when the doll receives an impact. Alternatively, a weighted frangible member can be used which will break upon severe, sudden movement of the doll.

Gentle handling includes protecting the doll from loud noises such as loud music and shouting. A sound sensitive switch may be used which will momentarily activate when the doll is exposed to a loud noise. As with rough handling, this switch will initiate crying, which can be stopped by "comforting" or feeding the doll.

Preferably, the electronic circuit includes means by which the person running the training program can select the range of times between crying episodes, the length of crying episodes and the crying volume. This makes it possible to simulate a sick, well or ideal baby at different times. While other crying simulators can be used, ideally the sound is the recorded sound of an actual baby crying.

The internal components should be inaccessible to the assigned individual. The cover over the internal components could be locked, a conventional seal means that must be broken before the cover can be removed or a simple means such as tape signed by the teacher or dripping colored candle wax into the slots of screws holding the cover on could be used.

It is highly desirable that the doll be a good replica of an actual baby, anatomically correct and having a skin color and characteristics corresponding to the ethnic background of the assigned individual. Tests have shown that assigned individuals take a parental interest in their simulated babies, invariably naming them, borrowing or buying clothing to dress their doll, etc. Realistic dolls engender much more suspension of disbelief than do the sack of flour, eggs, etc. that have been used before for crude simulations of baby care. Both boys and girls benefit from having the care of a simulated baby for several days. Individuals who have participated in tests of this system have found that the need to wake up and "feed" the doll for several approximately 20 minute periods each night, and the resulting sleep deprivation, is very important to an understanding of the burdens of caring for a young baby. Therefore, the care periods should extend for several days.

BRIEF DESCRIPTION OF THE DRAWING

Details of the invention, and of preferred embodiments thereof, will be further understood upon reference to the drawing, wherein:

FIG. 1 is a schematic representation of a doll suitable for use in the system of this invention;

FIG. 2A is a schematic diagram of the power conditioning portion of the control and recording circuit of this invention;

FIG. 2B is a schematic electronic diagram of a second portion of the circuit; and FIG. 2C is a schematic electronic diagram of a third portion of the circuit.

DETAILED DESCRIPTION OF PREFERRED EMBODIMENTS

As seen in FIG. 1, the doll 10 simulating a young baby, typically in the up to 3 months age range is preferably anatomically correct. Preferably, a doll assigned to a particular individual will have a skin color and other characteristics conforming to the ethnic characteristics of that individual. Generally, that individual will be given a choice of a male or female doll. Such realistic, life-size newborn dolls are available from the Doll Factory under the Berjusa brand and from the Bert Perlman company under the Furga brand.

The electronic components described below are contained within doll 10, with a cover 12 providing access. Cover 12 can be at any suitable location, typically on the side or back of the doll. Preferably, anti-tampering means, such as a key operated lock, a conventional wire or plastic seal, colored wax in the cover screw or bolt slots, is used to prevent (or make apparent) tampering with the internal components by the assigned individual.

As discussed above, the circuitry will cause the doll to emit a crying sound at selected, somewhat random, intervals for selected periods. A switch is provided which must be manually held in the closed position to silence the crying sound. Release of the switch will allow the sounds to continue. While any suitable switch, such as a simple spring loaded push button switch can be used, the switch arrangement shown is preferred.

A key 14, preferably in the shape of a baby bottle nipple or a miniature baby bottle, is secured to a bracelet 16, typically of the type used in hospitals which must be cut for removal. A suitably coded key end is provided to engage the correspondingly coded switch (not seen) within opening 15 in the doll when the key is turned. The switch is spring loaded so that if the key is released, such as if the individual dozes off, the switch will open and the crying sound will resume. Key 14 may be at the end of a short cord permitting it to be comfortably held in the hand and may be releasably secured to bracelet 16 by any suitable clip, hook-and-loop material of the sort sold under the Velcro trademark, etc., for convenience between "feedings".

FIGS. 2A, 2B and 2C show portions of the complete preferred electronic circuit for operating the doll features, divided for convenience of illustration. Unless otherwise indicated, all resistances shown are in ohms, all capacitance in microfarads and all diodes are typically 1N914 diodes of the sort available from EXL Semiconductor or Rohm Semiconductor.

FIG. 2A shows the power supply for the system. A 9 volt battery 18 is connected to ground through a power conditioning and reversal protection network 20 made up of capacitors 22 and 24 and diode 26, typically an 1N4001 from EXL Semiconductor. In FIGS. 2B and 2C, "9 V" indicates a connection to the power supply of FIG. 2A. Battery 18 can be a conventional single use battery or a rechargeable battery as desired. If a rechargeable battery is selected, conventional recharging contacts (not shown) would be supplied.

FIGS. 2B and 2C will be discussed together, as a single overall circuit. Connections between the portions shown in the two Figures are indicated by circled numbers 1, 2 and 3.

The period between "hunger" crying periods and length of crying periods are each randomly selected by components including randomizer 28, typically a CMOS 4022 from SGS Thompson or Harris Semiconductor and a timer 30, typically a CMOS L555 from Texas Instruments, ICM or SGS Thompson. Each time the doll cries, for any reason, a signal passes through line 32 to randomizer 28 to increment to the next timer speed in a pseudo random sequence. A range of timer speed, resulting in a range of sleep periods, such as will simulate sick, well or ideal babies, is selected by the 5 megohm potentiometer 76.

Output of randomizer 28 and timer 30 pass to crying period counter 34, typically a CMOS 4020 from Harris Semiconductor or SGS Thompson and crying start/stop logic chip 36, typically a CMOS 4082 from Harris or SGS. This signal then passes to buffer inverter 38, typically a CMOS 4049 from Harris or SGS and sleep/cry logic chip 40, typically another CMOS 4082. The signal then goes through line 42 (FIG. 2C) to the gate of power switch 44, typically an IRFD 9010 MOSFET or HEXFET from International Rectifier. A high signal to power switch 44 is a sleep or quiet signal while a low signal is a hunger or cry signal. The cry signal switches 9 volt power which passes through a 6 volt regulator 72, typically a 78L006 from EXL Semiconductor, to a record/playback chip 60, typically an ISD1110 or other 1100, 1200 or 1400 series sound chip from Information Storage Devices. The switched 9 volt power passes directly to audio amplifier 46, typically an LM386N-3 from National Semiconductor, then to a speaker 48, typically an 8 ohm, 2 watt, speaker such as a Cord 70RP01M.

Once the crying sound has begun, the assigned individual closes the "feeding" switch, preferably by operating key 14 as described above. Key 14 closes normally open switch 50 (FIG. 2B) connected to buffer inverter 38 to turn off the "cry" signal. If the key is released during a crying period, the switch will open to the spring loaded, normally open, position and the crying sound will again be heard.

A position sensor switch 52 is preferably included, typically a mercury tilt switch that is closed with the doll on its back and open on its stomach or side. Switch 52 is connected to buffer inverter 38 to cause the crying sound to be heard if the doll is put down to sleep on its back, to encourage the assigned individual to use the preferred stomach or side sleeping position.

A trembler switch 54 consisting of a lead weight at the free end of a springy wire, surrounded by a ring contact, is preferably included to provide an indication of rough handling of the doll. Switch 54 is normally open but closes in response to inertial forces of the sort caused by dropping, shaking or otherwise roughly handling the doll. A signal from switch 54 passes to buffer inverter 38 and will cause crying during rough handling, such as shaking. The sensitivity of trembler switch 54 is adjustable by varying the distance between the lead weight and the adjacent movable contact. A "loud sound" sensor switch 55, typically a sound-actuated relay or the sort described in the Ratio Shack "Engineers Mini-Notebook, page 37, catalog No. 2765011A, is provided in parallel with trembler switch 54 to close in response to loud noises and activate a crying sequence.

In summary, the crying logic chip 40 causes the doll to be quiet if (1) the doll is asleep (not hungry) and lying on its stomach or side and not being fed, or (2) the doll is hungry, being held on its back and being fed. In all other circumstances the doll will cry. The trembler switch 54 and loud-sound activated switch 55 cause the doll to become hungry for a short period, typically a minute or two, acting as if it had just been rudely awakened.

In order to simulate the characteristics of a drug-dependent baby, a device 57 making the doll tremble when it cries may be included. Typically, a small electric motor, such as a Radio Shack No. 273-237 spinning an out-of-balance weight is effective. A switch 59 activates this feature when desired. In addition a delay circuit 61 may be included to delay quieting when feeding begins a short period.

A signal from switch 54 passes through line 56 to a CMOS 4043 flip flop 58, available from Harris or SGS (FIG. 2C) which also receives a crying time input through lines 58 and 60. Line 60 typically provides a 2 minute delay causing LED 62 (typically yellow) to light after two minutes of uninterrupted crying. Line 58 typically provides a 10 minute delay, causing LED 64 (typically red) to light after 10 minutes of uninterrupted crying. If rough handling occurs, the signal from line 56 will cause LED 66 (typically blue or green) to light. These diodes are positioned within a transparent portion of cover 12 (FIG. 1) for observation from the exterior of doll 10.

A recording of an actual crying baby for playback during crying periods is provided in record/playback unit 68, (FIG. 2C) typically an ISD 1100, ISD 1200 or ISD 1400 Series from Information Storage Devices. A powerup delay network 70 is provided to operate the record/playback chip in continuous looping playback mode at power up. In this mode, a typically 10 second recording of crying will repeat over and over until the doll is quieted. Crying sound volume is adjusted at variable potentiometer 74.

While certain preferred materials, dimensions and arrangements have been detailed in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

We claim:

1. An infant care simulation system for use by an individual in simulating early parenthood which comprises:
   a doll having approximate shape and weight equivalent to a young baby;
   means within said doll for generating sounds simulating a baby crying;
   crying interval timer within said doll for randomly starting said crying sounds within a selected time range;

crying duration timer within said doll for randomly setting crying sound duration within a selected time range;

quieting means for actuation only by an assigned individual to quiet said crying sounds; and said quieting means requiring continuous actuation by the assigned individual during said crying sound duration.

2. The infant care simulation system according to claim 1 wherein said quieting means comprises a key means secured to said assigned individual which must be engaged with said quieting means in said doll during said crying sound duration to maintain said doll quiet.

3. The infant care simulation system according to claim 2 wherein said key is secured to a bracelet around the wrist of the assigned individual, which bracelet can only be removed by being cut.

4. The infant care simulation system according to claim 1 further including means for sensing the position of said doll and for actuating said crying sound generating means if the doll is in a position other than on its back when said quieting means is actuated and in a position other than its stomach or side when the crying sound means is not actuated.

5. The infant care simulation system according to claim 1 further including means within said doll for indicating rough handling of the doll.

6. The infant care simulation system according to claim 5 wherein said means for indicating rough handling includes an inertial means that changes state upon an instance of rough handling and generates a visible signal indicating rough handling and a window in said doll through which said visible signal can be observed and means to initiate crying sounds for a selected interval.

7. The infant care simulation system according to claim 1 further including means for generating sounds simulating a baby crying in response to loud sounds in the vicinity of the doll.

8. The infant care simulation system according to claim 1 further including means for selectively causing the doll to tremble when crying to simulate a drug-dependent baby.

9. The infant care simulation system according to claim 1 further including means for delaying the quieting of the crying sound for a short period when feeding is begun to simulate a drug-dependent baby.

10. The infant care simulation system according to claim 1 wherein said doll is anatomically correct and is formed from plastic material simulating the skin of a human baby.

11. The infant care simulation system according to claim 1 wherein said system further includes accessory equipment to be kept with said doll at all times by said assigned individual, said equipment selected from the group consisting of car seats, strollers, diaper bags and combinations thereof.

12. The infant care simulation system according to claim 1 further including means within said doll, inaccessible to the assigned individual, for selecting the range of time between crying sound periods and for selecting the range of crying sound duration.

13. The infant care simulation system according to claim 1 further including means within said doll, inaccessible to the assigned individual, for selecting the volume of said crying sound.

14. The infant care simulation system according to claim 1 wherein said means for generating crying sounds comprises a recording of a human baby crying and means for playing that recording.

15. The infant care simulation system according to claim 1 further including at least one first light and means to energize said light in response to failure to actuate said quieting means within a selected time after initiation of a simulated crying period and a second light and means to actuate said second light in response to rough handling of the doll.

16. The infant care simulation system according to claim 15 where in said at least one first light includes a plurality of different colored light emitting diodes which are energized by said actuation means after different periods of time have elapsed between initiation of a simulated crying period and actuation of said quieting means.

17. The infant care simulation system according to claim 1 further including means to indicate tampering with the components within said doll.

18. An infant care simulation system for use by an individual in simulating early parenthood which comprises:

a doll having approximate shape and weight equivalent to a young baby;

means within said doll for generating sounds simulating a baby crying;

crying interval timer within said doll for randomly starting said crying sounds within a selected time range;

crying duration timer within said doll for randomly setting crying sound duration within a selected time range;

quieting means for actuation only by an assigned individual to quiet said crying sounds;

said quieting means requiring continuous actuation by the assigned individual during said crying sound duration; and recording means within said doll for indicating the time between initiation of a crying interval and actuation of said quieting means.

19. A method for training a person in proper child care and for familiarizing the person with the burdens of caring for a young baby wherein the person to be trained performs the steps of:

taking custody of the following items:
 a doll including means for generating sounds simulating a baby crying, timing means for randomly starting said crying sounds and for causing said sounds to continue for preselected durations and a quieting means receiver requiring continuous manual actuation;
 at least one item of baby-related equipment selected from the group consisting of car seats, strollers, diaper bags; and
 quieting means for connection to said quieting means receiver to quiet the doll during the connection period;

takes the doll and said item of equipment wherever he/she goes;

utilizing said items of equipment as with an actual baby;

whenever a crying period begins, engaging said quieting means;

and manually maintaining said quieting means in operative connection to said quieting means receiver to quiet the doll for the duration of a crying period.

20. The training method according to claim 19 wherein said doll further includes means for sensing position of the doll and for actuating said crying sound generation when the doll is in other than a particular position under predetermined conditions and includes the further step of said person placing said doll in said particular position during said predetermined conditions to quiet said doll.

21. The training method according to claim 19 wherein said doll further includes means for indicating rough handling of the doll and further including the step of said person handling the doll in a manner preventing said rough handling indicating means from being actuated.

22. The training method according to claim 20 wherein said doll further includes means for actuating said crying sound generating means in response to loud sounds in the vicinity of the doll and further including the step of said person actuating quieting means by eliminating said loud sounds.

23. The training method according to claim 19 wherein said doll further includes means for recording and indicating time between initiation of crying and actions by said person to end the crying period and further including the step of said person reviewing indicated time periods with an instructor.

* * * * *